(12) United States Patent
Sarawat et al.

(10) Patent No.: US 9,003,024 B2
(45) Date of Patent: Apr. 7, 2015

(54) USAGE BASED ACCOUNTING FOR NETWORK DEPLOYMENT

(75) Inventors: Vikas Sarawat, Broomfield, CO (US); Bernard McKibben, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 194 days.

(21) Appl. No.: 13/536,188

(22) Filed: Jun. 28, 2012

(65) Prior Publication Data

US 2014/0006593 A1   Jan. 2, 2014

(51) Int. Cl.
*H04W 24/00* (2009.01)
*G06F 15/173* (2006.01)
*H04L 12/14* (2006.01)
*H04L 29/12* (2006.01)
*H04M 15/00* (2006.01)

(52) U.S. Cl.
CPC ........... *H04M 15/00* (2013.01); *H04L 12/1435* (2013.01); *H04L 61/00* (2013.01); *H04M 15/58* (2013.01); *H04M 15/8214* (2013.01)

(58) Field of Classification Search
CPC ... H04L 63/08; H04L 29/12018; H04L 61/10; G06F 21/552
USPC .......................................................... 709/224
See application file for complete search history.

(56) References Cited

U.S. PATENT DOCUMENTS

| | | | |
|---|---|---|---|
| 2003/0110252 A1* | 6/2003 | Yang-Huffman | 709/224 |
| 2007/0220605 A1* | 9/2007 | Chien | 726/23 |
| 2010/0318647 A1* | 12/2010 | Savoor et al. | 709/224 |
| 2011/0119371 A1* | 5/2011 | Toshima et al. | 709/224 |
| 2011/0191223 A1* | 8/2011 | Singh et al. | 705/34 |

* cited by examiner

*Primary Examiner* — Ruolei Zong
(74) *Attorney, Agent, or Firm* — Great Lakes Intellectual Property, PLLC.

(57) ABSTRACT

Usage based accounting is contemplated. The usage based accounting may be beneficial in facilitating assessment of data usage for devices connected inside of a network address translator (NAT) or other type of device having limited capabilities to associated data usage with specific user devices.

18 Claims, 4 Drawing Sheets

| User #1 ID (e.g. MAC) | Private IP (e.g. address #4) | NATed IP (e.g. address #2) | List of Ports Used by User #1 (e.g. 2345,9999) | Start & End Time |
|---|---|---|---|---|
| User #2 ID (e.g. MAC) | Private IP (e.g. address #5) | NATed IP (e.g. address #2) | List of Ports Used by User #2 (e.g. 5423,8998, 7856) | Start & End Time |
| User #1 ID (e.g. MAC) | Private IP (e.g. address #6) | NATed IP (e.g. address #2) | List of Ports Used by User #3 (e.g. 4561,3290) | Start & End Time |

*Fig. 6* — 44

| Amount of Data (e.g. Bytes) From and To an IP (e.g. address #2) and Port (e.g. 5423) Combination | Start and End Time |
|---|---|
| Amount of Data (e.g. Bytes) From and To an IP (e.g. address #2) and Port (e.g. 5423) Combination | Start and End Time |
| ………… | ………… |
| ………… | ………… |

*Fig. 7* — 46

| NATed IP From the First NAT (e.g. address #2) | NATed IP Port From the First NAT (e.g. 5423) | NATed IP Address (e.g. address #1) | NATed IP Port (e.g. 5000) | Start and End Time |
|---|---|---|---|---|
| NATed IP From the First NAT (e.g. address #2) | NATed IP Port From the First NAT | NATed IP Address (e.g. address #1) | NATed Port | Start and End Time |
| ………… | ………… | ………… | ………… | ………… |

*Fig. 8* — 64

| Amount of Data From and To User #1 ID | Start Time and End Time |
|---|---|
| Amount of Data From and To User #2 ID | Start Time and End Time |
| Amount of Data From and To User #3 ID | Start Time and End Time |

*Fig. 9* — 66

USAGE BASED ACCOUNTING FOR NETWORK DEPLOYMENT

TECHNICAL FIELD

The present invention relates to accounting data usage for a network, such as but not necessarily limited to accounting data usage of a wireless network.

BACKGROUND

Internet service providers (ISPs) or other data service providers may desire an accounting of data usage in order to track usage over a network. The ability to track data usage can be beneficial in assessing network congestion, historical usage patterns and other network related operational characteristics. This information, for example, may be used to adjust network operating settings or to take other action desirable to maintaining a high quality of service. The ability to track data usage may also be beneficial in order to bill users for consumed services. Some network providers may bill subscribers according to a number of bytes consumed over a given period of time or according to various billing tiers that provide price breaks contingent on an amount of data usage occurring over a given period of time. Accordingly, there is a need to assess data usage or other network consumption related information, particularly when devices are communicating over the network in order to reach devices connected to the Internet or at other locations associated with service provider.

Internet Protocol (IP) is a computer network protocol (analogous to written and verbal languages) that all machines on the Internet must know so that they can communicate with one another, i.e., IP is a layer 3 (network layer) protocol in the Open Systems Interconnection (OSI) model. The vast majority of IP devices support IP version 4 (IPv4) defined in RFC-791, the disclosure of which is hereby incorporated by reference in its entirety, and/or IP version 6 (IPv6) defined in RFC-2460, the disclosure of which is hereby incorporated by reference in its entirety. Devices relying on IP may be assigned an IP address (e.g., an IPv4 and/or an IPv6 address). In some cases a device may be assigned a private or inside IP address for use over a private or inside network, such as a home network or other network internal to the service provider, and another public or outside IP address for use over a public or outside network, such as the Internet. U.S. patent application Ser. No. 13/285,676, the disclosure which is hereby incorporated by reference in its entirety, relates to one method of facilitating use of inside and outside addresses with network address translation.

A network address translator (NAT) or a carrier grade network address translator (CGN) may be utilized to facilitate translating communications for devices which require association with inside and outside addresses. The use of inside and outside addresses can be problematic in tracking data usage for the associated user devices. In particular, the service provider or other entity tasked with tracking data usage may be unaware of the inside addresses assigned to a particular user. This problem can occur, for example, when a home network, Wi-Fi hotspot or a community type of network relies on a NAT to translate addresses for user devices that periodically or temporarily use the network. The problem can become further complicated in systems that allow temporary authentication or temporary user access, such as through a zero sign-on (ZSO) operations like the one described in the U.S. patent application Ser. No. 13/423,359, the disclosure of which is hereby incorporated by reference in its entirety, as the service provider may be unable to assess usage attainable to a particular device due to being unaware of the configuration or methods by which a NAT of a visited network translates addresses.

While the present invention contemplates its use and application with an wireline or wireless network, including optical and cellular types of networks, one problem contemplated by the present invention relates to tracking data usage where all or part of the data usage is tracked for a network that relies upon cable as a communication medium. Data Over Cable Service Interface Specification (DOCSIS), including four DOCSIS1.0, DOCSIS 1.1, DOCSIS 2.0 and DOCSIS 3.0, the disclosures of which are hereby incorporated by reference in their entirety, defines an architecture for supporting network related communications over a cable medium. DOCSIS architecture for IP High Speed Internet (HSD) services makes one important and fundamental assumption that there is a one to one mapping between the subscriber and Cable Modem (CM). At least in so far as assuming that all the user data that originates and terminates at a particular CM can simply be attributed to the subscriber of the CM, which prevents it from attributing data to particular devices behind the CM.

DOCSIS requires the CMTS to collect and report network usage accounting reports on a per CM basis. DOCSIS also supports collection and reporting of data usage on a per Service Flow (SF) basis. With the launch of Wi-Fi roaming service using the existing CMs in the subscriber homes or other places (e.g., Wi-Fi hotspots), the basic assumption of one-to-one mapping between the subscriber and CM does not hold true. This is because the Wi-Fi roaming services allow multiple roaming subscribers to obtain IP or HSD services from behind a single CM. The present invention contemplates allowing the service providers, including non-cable service providers, the ability to identify one subscriber traffic from another in order for accounting to work properly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
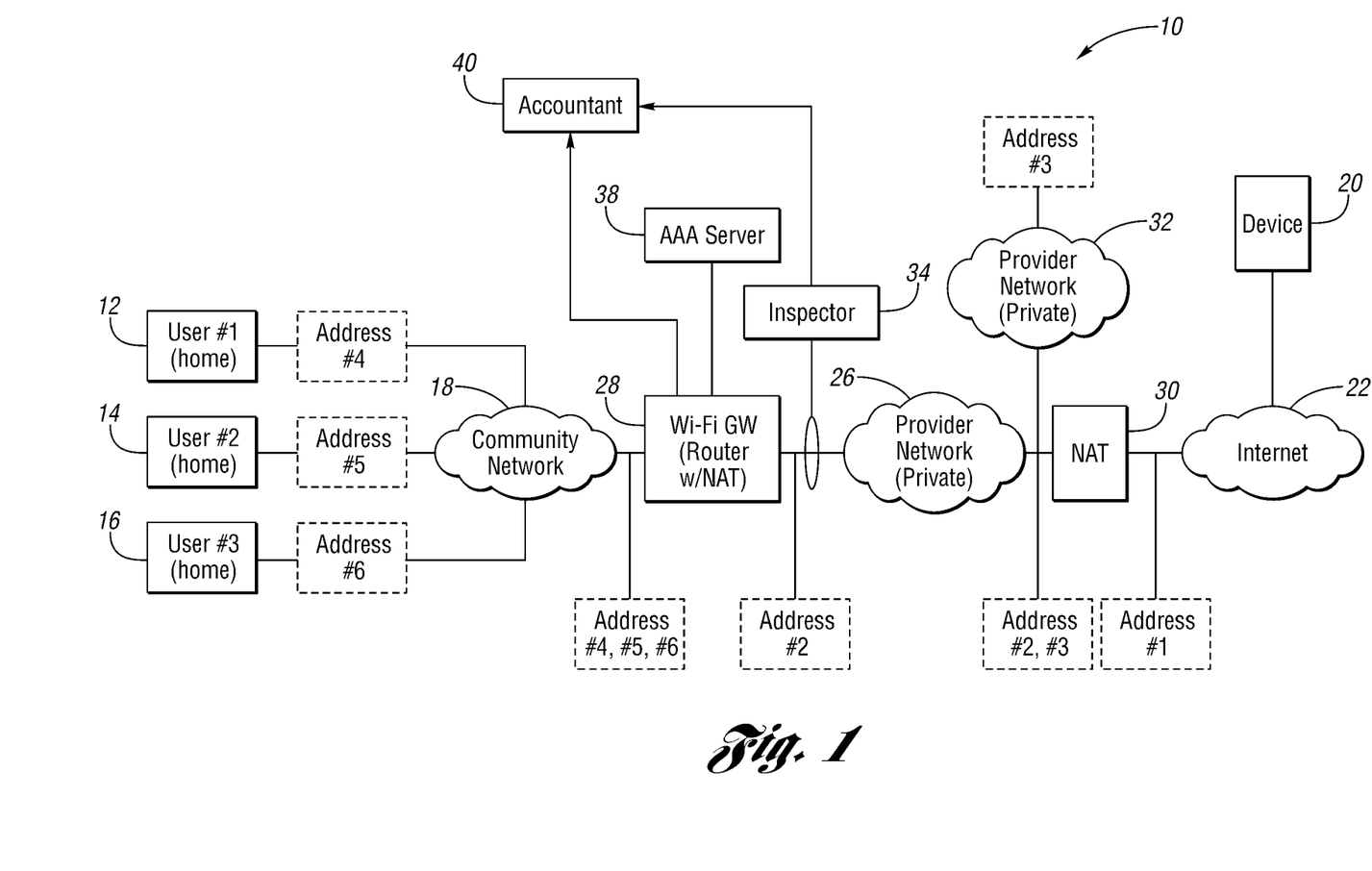
FIG. 1 illustrates a usage based accounting system as contemplated by one non-limiting aspect of the present invention.

FIG. 1 illustrates a usage based accounting system 10 in accordance with one non-limiting aspect of the present invention. The system 10 relates to a networking environment where a plurality of user devices 12, 14, 16 may rely upon a network 18, such as a home network or community network where user devices 12, 14, 16 are free to join and leave the network 18, to facilitate communications with devices 20 connected to the Internet 22 or elsewhere. A service provider (not shown), such as but not necessarily limited to a high-speed data provider, an Internet service provider (ISP), a multiple system operator (MSO), a cable television service provider, a broadcast television service provider, a satellite television service provider, a cellular phone service provider, a voice over Internet protocol (VoIP) service provider, may provide a provider network 26 to facilitate communications between the community network 18 and the Internet 22. The provider network 26 may be a wireline and/or wireless network, such as an optical network, a cable network, a cellular network, a Wi-Fi network or some combination thereof.

A gateway 28, such as a Wi-Fi gateway having an integrated or associated router and network address translator (NAT), may be included to facilitate interfacing signals between the community network 18 and the provider network 26. The gateway 28 may be a cable modem or other device having capabilities sufficient to facilitate the desired signal exchange between the community network 18 and the provider network 26, including but not necessarily limited to a gateway 28 configured to facilitate interfacing signals according to DOC SIS. The present invention is predominately described with respect to the service provider being a cable television service provider or data type of service provider that facilitates network related communications over a hybrid fiber-coaxial (HFC) type of infrastructure. This is done, however, without intending to limit the scope of the present invention as the present invention fully contemplates its use and application in any number of networking environments and is not necessarily limited to environments which rely upon a coaxial cable or DOCSIS. This exemplary description is provided since it highlights one protocol where system devices external to the gateway 28 lack sufficient mechanisms by which users 12, 14, 16 of the community network 18 can be easily identified.

The gateway 28, or more particularly the associated router, may be configured to facilitate wireline and/or wireless networking with the user devices 12, 14, 16. The gateway 28 may be associated with a subscriber of the service provider, such as but not necessary limited to a home subscriber or other entity (e.g., wireless hotspot or cellular tower). The NAT portion of the gateway 28 may be configured to facilitate sharing one or more addresses used outside of the gateway 28 with the user devices 12, 14, 16, such as by assigning each user device 12, 14, 16 unique inside addresses to be used over the community network 18 while allowing one or more of the user devices 12, 14, 16 to share the same outside address, i.e., an address used external to the gateway 28. In the event the provider network requires similar network address translation, such as if the provider network requires mapping of IPv4 too IPv6 addresses or otherwise has an insufficient number of inside addresses, an additional NAT 30 may be configured to facilitate additional address sharing and translation for other networks 32.

FIG. 1 illustrates an addressing scenario where one NAT 30 translates a first address to a second address and a third address where the second address is then translated by the gateway 28 to a fourth address, a fifth address, and a sixth address. The addresses may correspond with IPv4 and/or IPv6 addresses. The system 10 may be configured such that a single address (e.g., the first address) may undergo multiple address translations when facilitating communications with the user devices 12, 14, 16. In the event the device 20 desires to communicate with the first user device, a message or other signaling source from the device 20 would be initially address to the first address, then translated with the NAT to the second address, and then further translated by the gateway 28 to the fourth address. A similar address translation process may occur in the event the device 20 were to desire communications with other user devices 14, 16 associated with the service provider, such as those associated with the second service provider network used to support another geographical area (e.g., the third address).

While the translation associated with a single address (e.g., the first address) is illustrated, the present invention fully contemplates facilitating the simultaneous translation of any number of inside or private addresses (i.e., addresses used to the left of the gateway 28 and/or NAT 30) relative to any number of outside or public addresses (i.e., address is used to the right the gateway 28 and/or NAT 30). For exemplary purposes, the address being used by one of the gateway 28 and NAT 30 may be referred to as a "NATed" since it is the address being shared with a plurality of user devices 12, 14, 16, i.e., if defined relative to the gateway 28, or being made available for sharing with other gateways (not shown) connected to the other provider network 32. The gateway NAT 28 and/or the NAT 30 may have limited capabilities for tracking certain parameters of the messages and/or data transmitted therethrough. The gateway NAT 28, for example, may be a type of NAT that is unable to track data usage or to associate data usage or other types of network consumption with a specific one or more of the user devices 12, 14, 16, i.e., the gateway NAT 28 may be aware of the user devices 12, 14, 16 but it may be unable to particularly associate data usage with them.

An inspector 34 may be included to facilitate monitoring data or other network usage usages. The inspector 34 may be configured as a deep packet inspection (DPI) tool capable of inspecting data packets as they transmitted between the community network 18 and the provider network 26. The inspector 34 may be a snooping device or other device having capabilities sufficient to monitor data usage without disrupting or overly disrupting the data travel between the community network and the service provider network 26 and/or the Internet 22. An authentication, authorization and accounting (AAA) server 38 may be included to facilitate authenticating the user devices 12, 14, 16. The user device authentication may include authenticating the user devices 12, 14, 16 to communicate with the community network 18 and/or the provider network 26. This may include granting user devices 12, 14, 16 temporary access or visitor access to the networks 18, 26 and/or the Internet 22 according to relational agreements with their associated service providers, such as according to the ZSO processes noted in the background section.

An accountant 40 may be included to facilitate accounting data usage. The accountant 40 may be configured to receive messages from the gateway 28 and/or inspector 34 to facilitate generating data usage reports/accounts. The accountant 40 may include a computer-readable medium having computer-readable code embodied therein for controlling a computing device to electronically facilitate generating data usage related information. This may include automatically generating reports for any one or more pieces of data collected by the gateway 28 and/or inspector 34 that can be related to users associated with the consuming user devices 12, 14, 16. While the data usage may relate to various types of data, the present invention fully contemplates measuring data associated with consumption of network services, e.g., the number of bytes consumed by one or more of the user devices for a reporting period of time. The data usage may similarly be collected for number of bytes for different applications, number of bytes for a selected group of users, average speed etc.

Figure 2:
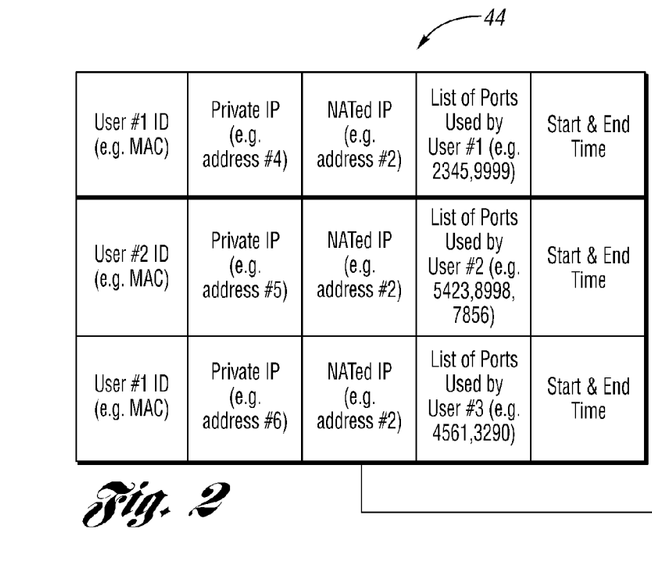
FIG. 2 illustrates a NAT usage report as contemplated by one non-limiting aspect of the present invention.

FIG. 2 illustrates a NAT usage report 44 electronically generated by the gateway 28 for transmission to the accountant 40 in accordance with one non-limiting aspect of the present invention. The NAT usage report 44 may be used to report data usage, address assignments and other information to the accountant 40. The NAT usage report 44 is shown to include a listing of private addresses according to user ID, used port, NATed address and usage period occurring over a reporting period. The private addresses may correspond with addresses actually being used by the gateway 28 to uniquely address messages carried over the community network 18. The user IDs may correspond with a media access control (MAC) address assigned to each of the user devices 12, 14, 16, a username provided by the user device 12, 14, 16 at the time of logging into the gateway 28 or other information from which the user may be identified. The NATed addresses may be used to indicate the outside address being shared by one or more of the user devices 12, 14, 16.

The listing of ports may be used to identify the ports assigned by the gateway 28 to the user devices 12, 14, 16 over the reporting period of time. The messages communicated with the user devices 12, 14, 16 may be addressed relative to a combination of the private address and allocated port. If operating according to IP, the private and NATed addresses may be IP addresses and the number of ports available through the gateway 28 may equal 65,535. The gateway 28 may be configured to randomly assign the ports and/or to assign the ports according to a port allocation algorithm, which may vary depending on a manufacture of the gateway 28 such that multiple gateways 28 having different port allocation algorithms may be used to interface with the service provider networks 26, 32. This can be particularly problematic since it can make it difficult for the inspector 34 and/or accountant 40 to become aware of port assignments prior to the ports action being assigned to particular sessions.

Figure 3:
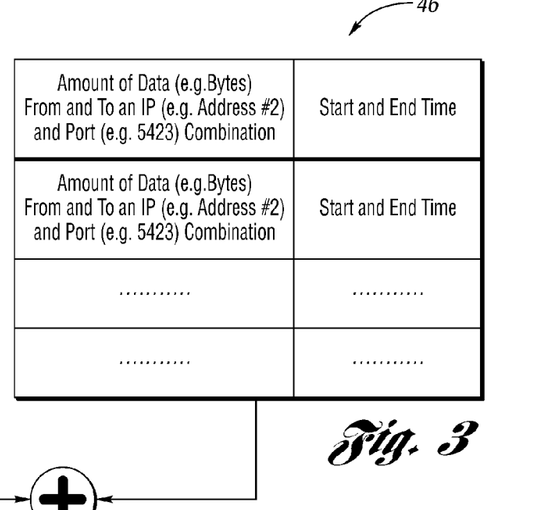
FIG. 3 illustrates an inspector usage report as contemplated by one non-limiting aspect of the present invention.

FIG. 3 illustrates an inspector usage report 46 generated by the inspector 34 for transmission to the accountant 40 in accordance with one non-limiting aspect of the present invention. The inspector usage report 46 may be used to report data consumption and usage period for each used port associated with each NATed address of the gateway 28. The amount of data being consumed may be based on a period of time for which the inspector 34 was requested to generate the inspector usage report. The amount of data may be represented with a total amount of data, e.g., bytes, or an average data rate during the reporting period, e.g., bytes/hour. The metadata may also be reported differently depending on particular operating characteristics of the network 18, for example if the network 18 is a cellular network or optical network.

Figure 4:
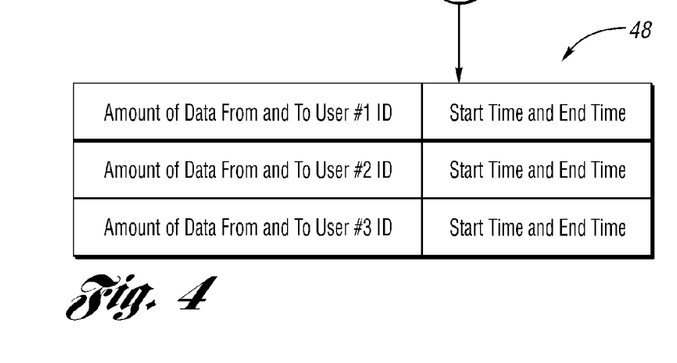
FIG. 4 illustrates an accounting as contemplated by one non-limiting aspect of the present invention.

FIG. 4 illustrates an accounting 48 generated by the accountant in response to electronic receipt of the NAT usage report 44 and the inspector usage report 46. The accounting 48 may be used to report data consumption and usage period for each user ID. The accountant 40 may be configured to automatically generate the report 48 by relating the information provided within the NAT usage report 44 to the information provided within the inspector usage report 46. In particular, this may include the accountant 40 looking for common references within each usage report 44, 46, such as the listed addresses, ports or combination thereof to generate a relation to the associated user ID. For example, in the event the inspector 34 identified 100 MB to be consumed by the second address while communicating over port 5423, this information may be cross-reference with the user ID associated with the corresponding combination of the second address and used port included within the NAT usage report 46, i.e., user #2 ID. The accountant 40 may then automatically generate a bill or other accounting reference to report 100 MB of data usage by user #2 ID for the reporting period of time.

Figure 5:
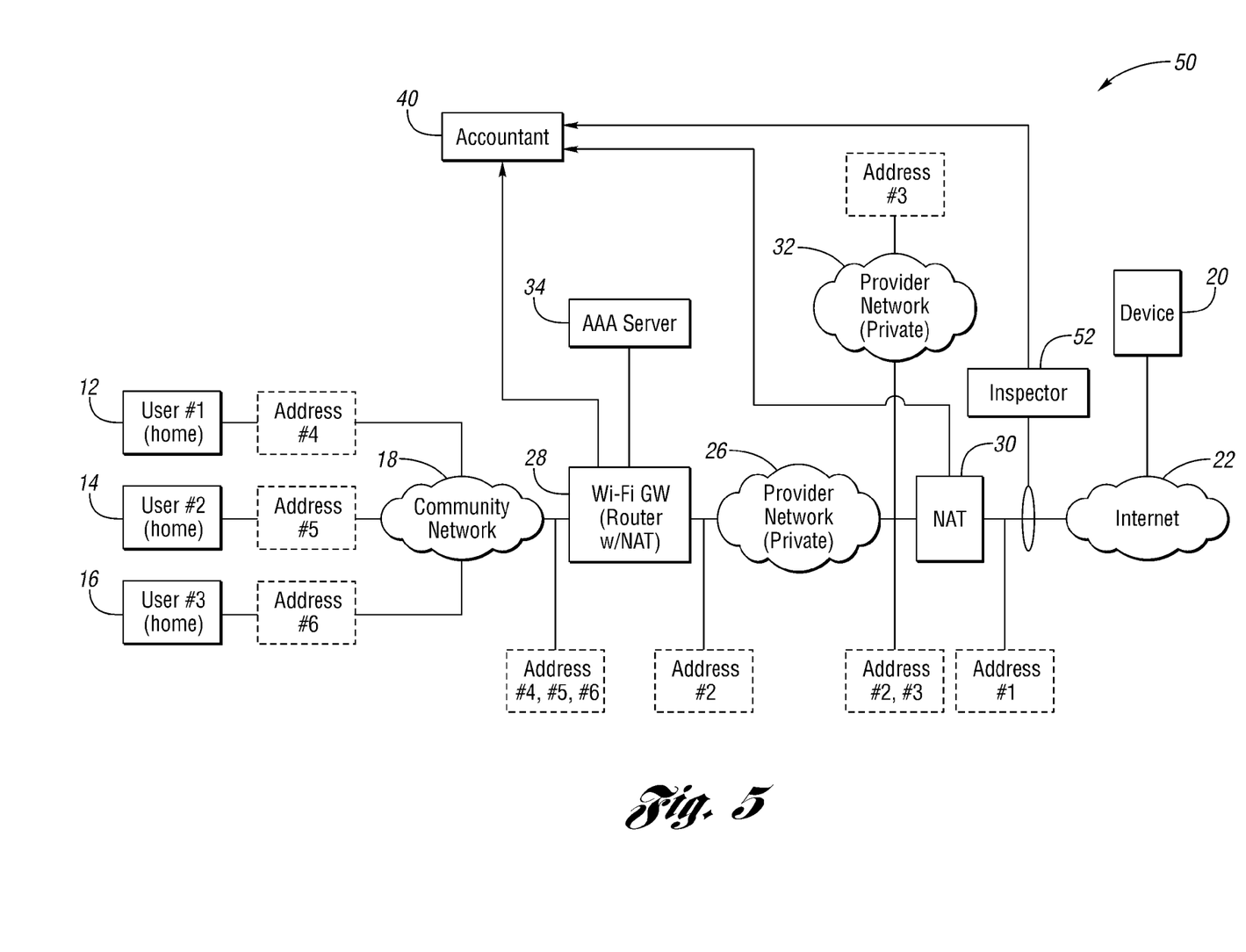
FIG. 5 illustrates a usage based accounting system as contemplated by one non-limiting aspect of the present invention.

FIG. 5 illustrates a usage based accounting system 50 having in accordance with one non-limiting aspect of the present invention. The system is configured similar to the system described above with respect to FIG. 1 except for an inspector 52 being positioned outside of the NAT 30. With this positioning, the inspector 52 is no longer able to report data consumption for address #2, i.e., the NATed addresses, associated with the gateway 28. Rather the inspector 52 is more limited to reporting consumption for address #1, i.e., the global address of the NAT 30, which as noted above with respect to FIG. 1 may be used to support the first and second network portions 26, 32, i.e., used by multiple gateways. The present invention, however, contemplates ameliorating these reporting limitations on the inspector 52 by relying on a second NAT usage report (64 see FIG. 8) to be provided by the NAT 30. The second NAT usage report 64 may be used to facilitate translating the global address to the individual NATed addresses shared by the one or more gateways 28 over the respective community networks 18. Only one community network 18 is shown to be connected to the gateway 28, however, additional gateways (not shown) may be connected to the second provider network.

Figure 6:
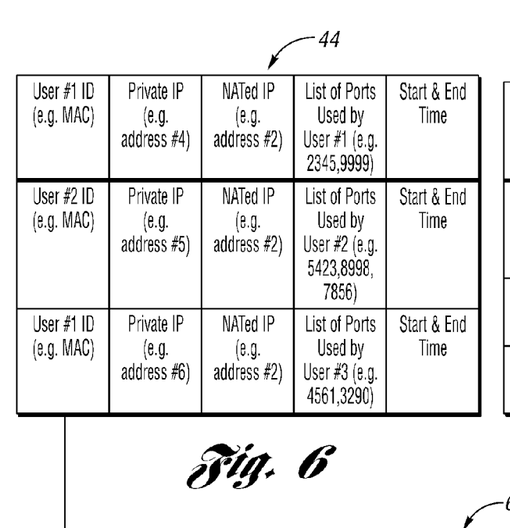
FIGS. 6-9 respectively illustrate a gateway usage report, and inspector usage report, a NAT usage report and an accounting report as contemplated by one non-limiting aspect of the present invention.
Figure 7:
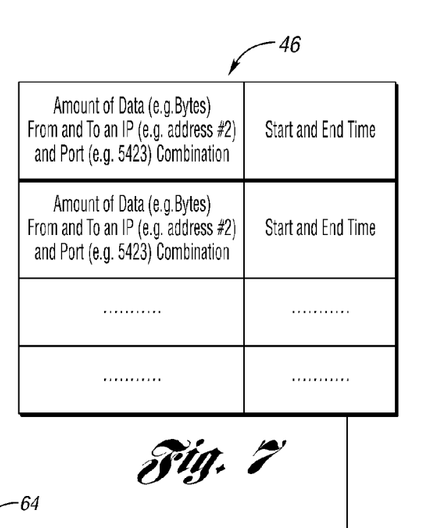
Figure 8:
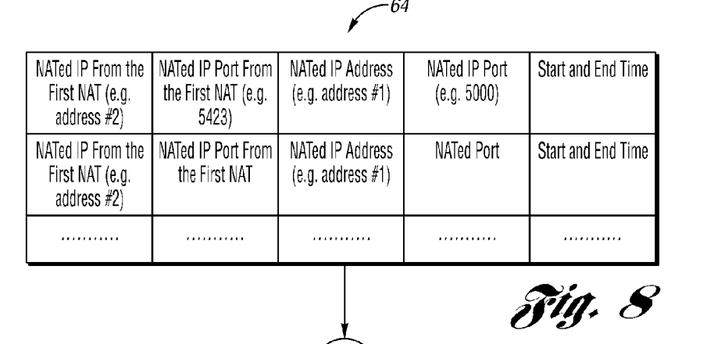
Figure 9:
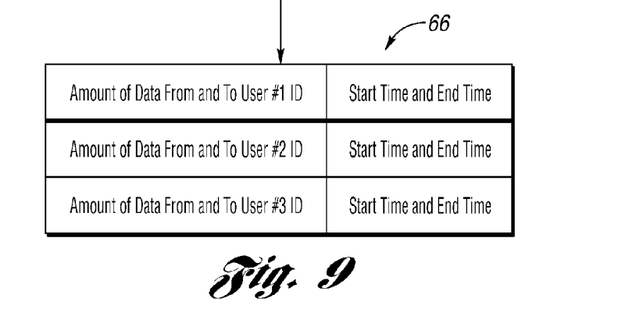

FIGS. 6-8 respectively illustrate the gateway usage report 44, the inspector usage report 46, and the second NAT usage report 64 generated according to the configuration of FIG. 5. The reports 44, 46 of FIGS. 6 and 7 are generally similar to the usage reports 44, 46 shown in FIGS. 2 and 3 with the inspector usage report 64 providing usage data for all addresses shared with the address #1. FIG. 9 illustrates an accounting 66 similar to the account report shown in FIG. 4 in that it reports usage according to user ID and start time and end time. This accounting 66 requires the additional information provided in the NAT usage report in order to sufficiently relate the generic usage data collected by the inspector 52 to the desired specificity of the gateway usage report 44, i.e., back to the user IDs. In this manner, the present invention contemplates the inspector 52 being included as a third-party entity or other device that may not have access to the internal operations and/or addresses required to facilitate packet inspection or other monitoring operations directly from the service provider networks. This may be particularly beneficial in reporting usage to advertisers or otherwise facilitating advertisement insertion with external entities according to data usage or other network consumption activities.

Figure 10:
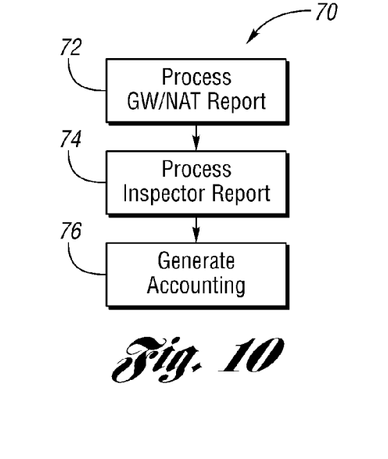
FIG. 10 illustrates a flowchart of a method of accounting data usage as contemplated by one non-limiting aspect of the present invention.

FIG. 10 illustrates a flowchart 70 of a method of accounting data usage for a community type of wireless network where the wireless network includes a network address translator (NAT) configured to share a public address across a community of user devices. The method may be embodied in a computer-readable medium of the accountant or other one or more of the devices shown in the Figures provided above or otherwise associated with the same. The method may include an accountant being configured to automatically issue instructions or otherwise command a gateway, NAT, and/or inspector to provide the various reports and usage information. The accountant may be configured to automatically generate the accounting and to provide the accounting to electronically transmit the accounting to a billing server, an advertiser, subscribers or other entities that may benefit from its ability to relate generic data consumption information to specific users.

Block 72 relates to processing a NAT usage report electronically transmitted from the NAT. The NAT usage report may include a listing of at least recently active private addresses according to user ID, used port, and usage period. In the event multiple and NATs are used, such as according to the configurations shown in FIGS. 1 and 5. Block 74 relates to processing an inspector usage report electronically transmitted from an inspector. The inspector usage report may include a listing of data consumption and usage period for each used port associated with the public addresses of the NAT usage report. Block 76 relates to cross-referencing the NAT usage report and the inspector report to electronically generate an accounting of data usage sufficient for listing data consumption and usage period for each user ID.

The method contemplates an inspector usage report being provided without listing the private addresses, i.e. without the inspector having to be aware of the unique addresses used by the gateway within the community network. The method contemplates generating the account of data usage without processing a port assignment algorithm used by the NAT to assign the used port addresses to the user devices or otherwise having to predict a mapping used by the NAT to assign the used port addresses to the user devices prior to the NAT assigning the used ports to the user devices. This may be beneficial since the NATs employed within the systems may vary depending on manufacturer, installation requirements, and other operational requirements that may be difficult for the accountant to track if the account were otherwise required to predict or otherwise understand the port allocation strategy employed by each NAT.

The method contemplates the NAT usage report being provided without listing data consumption. This may be beneficial in allowing the present invention to operate with existing/deployed NATs and/or without having to re-program instruct the NATs to perform data monitoring operations. The method contemplates generating the data usage for each user ID when multiple user devices are simultaneously relying on the NAT to translate to the same NATed address, which can occur when both of the first user and the second user are communicated to the gateway using the second address.

One non-limiting aspect of the present invention contemplates use of the cable modem termination station (CMTS) to generate accounting records for each subscriber as far as the traffic for each subscriber uses a different Service Flow (SF), but this method may not be feasible as the number of SF supported on a CM are limited.

One non-limiting aspect of the present invention contemplates generating accounting data where the Wi-Fi gateway (GW) publishes IP+Port usage report for each subscriber and the device in the core uses these reports from the Wi-Fi GW in combination with the user traffic to collect and report network usage accounting records. The present invention may be particularly beneficial when a WiFi roaming subscriber tries to access IP (HSD) over a community Wi-Fi GW. The WiFi gateway, which may also include a NAT and router, can use the subscriber MAC address to check with the AAA server as to whether the subscriber should be provided access or not. (The solution described here is not specific to MAC based authentication system. An operator can use other authentication system such as EAP-TLS.) After the authentication is deemed successful, the Wi-Fi GW permits the subscriber traffic to pass through. A Wi-Fi GW can allow multiple subscriber to simultaneously access Wi-Fi IP (HSD) service using the aforementioned steps. Thereafter, NAT devices can assign different ports to different subscriber dynamically as the subscriber initiate new UDP or TCP sessions.

In the event the algorithm for assigning ports is not standardized, which means that each vendor NAT behaves differently when it comes to the assignment of ports to subscribers, the present invention can be used to facilitate usage reporting. This allows the present invention to compensate for the operator core network having no way of predicting the mapping between ports and subscriber behind the NAT and/or for addressing port re-assignment of the type where, a port that was assigned to subscriber#1 a few minutes ago can be assigned to subscriber#2 once the flow associated with subscriber#1 is terminated. This ability of the present invention can be beneficial where WiFi network operators are interested in keeping and reporting network usage for purposes such as billing and settlements. The present invention contemplates a NAT function within the Wi-Fi GW that keeps records of the IP+Port assignment on each subscriber basis. Additionally these records may need to be maintained with a time stamp indicating when the port assignment occurred. It may also required that the NATs publish these records, on a near real time basis, to some server in the core of operator's network. This server in the network can then look at all the traffic generated from this Wi-Fi GW and use these port usage reports with time stamp to calculate network usage accounting record on a per user basis.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of accounting data usage for a community type of wireless network where the wireless network includes a network address translator (NAT) configured to share a public address across a community of user devices, the NAT being configured to translate the public address to private addresses unique to each user device, the method comprising:

processing a NAT usage report electronically transmitted from the NAT, the NAT usage report listing at least recently active private addresses according to user ID, used port, and usage period;

processing an inspector usage report electronically transmitted from an inspector, the inspector usage report listing data consumption and usage period for each used port associated with the public address;

cross-referencing the NAT usage report and the inspector report to electronically generate an accounting of data usage, the accounting listing data consumption and usage period for each user ID;

generating the account of data usage by:
i) matching used ports and usage periods listed in the NAT usage report to used ports and usage periods listed in the inspector usage report o generate matched consumption for the matched used ports relative to the correspondingly matched usage periods; and
ii) associating each matched data consumption value with a corresponding one of the user ID's listed in the NAT usage report, thereby generating the accounting of data usage for each user ID without the inspector usage report identifying the user ID's and without the inspector usage report identifying the private addresses.

2. The method of claim 1 further comprising:
the inspector usage report being provided without identifying the private addresses such that the cross-referencing determines the private addresses solely from the NAT usage report; and
the inspector usage report being provided without identifying user IDs such that the cross-referencing determines the user IDs solely from the NAT usage report.

3. The method of claim 1 wherein each user ID includes a media access control (MAC) address associated with a corresponding one of the user devices.

4. The method of claim 1 further comprising generating the accounting of data usage without processing a port assignment algorithm used by the NAT to assign the used port addresses to the user devices and without predicting a mapping used by the NAT to assign the used port addresses to the user devices prior to the NAT assigning the used ports to the user devices.

5. The method of claim 1 further comprising listing multiple data consumption and usage periods for the same used port in the event the NAT assigns the same used port address to multiple user devices during a reporting period covered by the accounting.

6. The method of claim 1 further comprising the NAT usage report being provided without identifying any data consumption associated with the user devices.

7. A non-transitory computer-readable medium having computer-readable code embodied therein for controlling a computing device to electronically facilitate generating data usage when a network includes a network address translator (NAT) configured to share one or more NATed addresses across a plurality of user devices, the NAT being configured to translate the NATed addresses to private addresses unique to each user device, the computer-readable code comprising instructions sufficient for:
processing a NAT usage report electronically transmitted from the NAT, the NAT usage report including a first entry for each of a plurality of translations performed with the NAT, each first entry listing a device-port-period combination associated with the corresponding translation, each device-port-period combination identifying:
i) one of the user devices associated with the corresponding translation; ii) a port on the NAT associated with the corresponding translation; and
iii) a period of use for the port associated with the corresponding translation;
processing an inspector usage report electronically transmitted from an inspector, the inspector usage report including a second entry for each of the plurality of translations performed with the NAT, each second entry listing a data-port-period combination associated with the corresponding translation, each data-port-period combination identifying:
i) a port on the NAT associated with the corresponding translation;
ii) a period of use for the port associated with the corresponding translation; and
iii) a data usage during the period for the corresponding translation; and
relating device-port-period combinations in the NAT usage report to the data-port-period combinations in the inspector usage report to identify communal entries, each communal entry matching one of the first entries to one of the second entries based on a unique commonality of ports and periods therein; and
generating an account of data usage for the user devices, the accounting listing a third entry for each of the communal combinations, each third entry identifying:
i) the user device from the first entry associated with the corresponding communal combination; and
ii) the data usage from the second entry associated with the corresponding communal combination.

8. The computer-readable medium of claim 7 further comprising instructions sufficient for identifying the communal entries solely from the device-port period and data-port-period combinations, thereby generating the account of data usage without the NAT report identifying the data usage and without the inspector usage report identifying the user devices or the private addresses.

9. The computer-readable medium of claim 7 further comprising instructions sufficient for generating the data usage without relying on the NAT usage report to identify any data usage.

10. The computer-readable medium of claim 7 further comprising instructions sufficient for generating the data usage without relying on the NAT usage report to identify data usage for the ports of the NAT.

11. The computer-readable medium of claim 7 further comprising instructions sufficient for generating the data usage without relying on the inspector usage report to identify the user devices and without relying the inspector usage report to identify the private addresses.

12. The computer-readable medium of claim 7 further comprising instructions sufficient for generating the data usage for each user device when multiple user devices are simultaneously relying on the NAT to translate to the same NATed address.

13. A networking system comprising:
a first network address translator (NAT) having a processor and being configured for translating a plurality of private addresses to a first address, the private addresses being used to facilitate addressing for a plurality of user devices over a first network inside of the first NAT and the first address being used to facilitate addressing for the user device over a second network outside of the first NAT, the first NAT being generating a first NAT usage report sufficient to relate the user devices to the private addresses and ports of the first NAT used when facilitating addressing over the second network;
a second NAT downstream of the first NAT, the second NAT having a processor and being configured for translating the first address to a public address to facilitate addressing for the plurality of user devices over a third network, the second NAT being generating a second NAT usage report sufficient to relate ports of the second NAT used when facilitating addressing over the third network;
an inspector having a processor and being configured for detecting date usage outside of the second NAT over the third network, the inspector generating an inspector usage report sufficient to relate the data usage to ports of the second NAT used when facilitating addressing over the third network; and
an accountant having a processor and being configured for relating the first NAT usage report, the second NAT usage report and the inspector usage report within and accounting report, the accounting report indicating data usage for each user device.

14. The system of claim 13 wherein the accounting report cross-references ports identified within the inspector usage report with the ports identified within the first and second NAT usage reports in order to relate the user devices with the data usage.

15. The system of claim 14 wherein the first and second NATs are configured to respectively generate the first and second NAT usage reports without identifying any data usage associated with the user devices.

16. The system of claim 13 wherein the first NAT generates the first NAT usage report to identify no more than user IDs associated with the user devices, the private addresses used over the first network; the ports used on the first NAT to facilitating addressing over the second network; and a duration during which each private address was used.

17. The system of claim 13 wherein generates the inspector usage report to include no more than the first address or other addresses u used by the second NAT, data usage associated with each port of the second NAT and a duration during which each port was used.

18. The system of claim 15 wherein the accounting reports identifies each user device according to a unique media access control (MAC) address and one or more the private addresses and wherein the inspector usage report list data usage without reference or relation to any of the MAC or private addresses included within the accounting report.

* * * * *